United States Patent
Hansch et al.

(10) Patent No.: US 7,318,693 B2
(45) Date of Patent: Jan. 15, 2008

(54) DEVICE FOR MACHINING WORKPIECES AND MACHINE ARRANGEMENT THEREFOR

(75) Inventors: Stefan Hansch, Aalen (DE); Peter Bielitza, Aalen (DE)

(73) Assignee: Alfing Kessler Sondermaschinen GmbH, Aalen (DE)

( * ) Notice: Subject to any disclaimer, the term of this patent is extended or adjusted under 35 U.S.C. 154(b) by 397 days.

(21) Appl. No.: 10/516,720

(22) PCT Filed: May 21, 2003

(86) PCT No.: PCT/EP03/05327

§ 371 (c)(1),
(2), (4) Date: Jun. 24, 2005

(87) PCT Pub. No.: WO03/101663

PCT Pub. Date: Dec. 11, 2003

(65) Prior Publication Data
US 2005/0238448 A1    Oct. 27, 2005

(30) Foreign Application Priority Data
Jun. 3, 2002    (DE) ................. 102 24 577

(51) Int. Cl.
    *B23C 1/12* (2006.01)
    *B23C 1/14* (2006.01)
    *B23C 1/027* (2006.01)
    *B23C 1/04* (2006.01)

(52) U.S. Cl. ............ 409/235; 409/211; 409/201; 409/165; 409/192; 408/236

(58) Field of Classification Search ........ 409/201, 409/211, 216, 235, 165, 192, 203, 213, 217; 408/236–237
See application file for complete search history.

(56) References Cited

U.S. PATENT DOCUMENTS

| | | | |
|---|---|---|---|
| 4,638,550 A | | 1/1987 | Malzkorn |
| 5,346,343 A | * | 9/1994 | Babel ............... 409/201 |
| 5,664,308 A | | 9/1997 | Deitert |
| 6,328,510 B1 | * | 12/2001 | Hanrath et al. ...... 409/235 |
| 6,582,168 B2 | * | 6/2003 | Hogl et al. ......... 409/190 |
| 6,761,518 B2 | * | 7/2004 | Stengele et al. ..... 409/235 |
| 2001/0006595 A1 | * | 7/2001 | Hogl et al. ......... 409/206 |

FOREIGN PATENT DOCUMENTS

| DE | 3330942 A1 * | 3/1984 |
|---|---|---|
| DE | 196 16 526 A1 | 11/1997 |

(Continued)

*Primary Examiner*—Erica Cadugan
(74) *Attorney, Agent, or Firm*—Wolf, Greenfield & Sacks, P.C.

(57) ABSTRACT

The invention relates to a device for machining workpieces, especially for chip removing machining. The device includes a spindle which is mounted on a first end of a pivoting arm in such a way that it can be linearly displaced in a direction parallel to the rotation axis of the spindle, and a console on which the pivoting arm is mounted by its second end in such a way that it can rotate about an axis parallel to the rotation axis of the spindle. The console can be displaced in a direction which is perpendicular to the displacement direction of the spindle in all of the pivoting positions of the pivoting arm.

12 Claims, 3 Drawing Sheets

FOREIGN PATENT DOCUMENTS

| | | | |
|---|---|---|---|
| DE | 19806085 A1 * | 4/1999 | |
| DE | 19963342 A1 * | 6/2001 | |
| EP | 0 002 621 A1 | 6/1979 | |
| EP | 0 908 269 A2 | 4/1999 | |
| FR | 2 528 745 | 12/1983 | |
| WO | WO 97/40960 A1 | 11/1997 | |

* cited by examiner

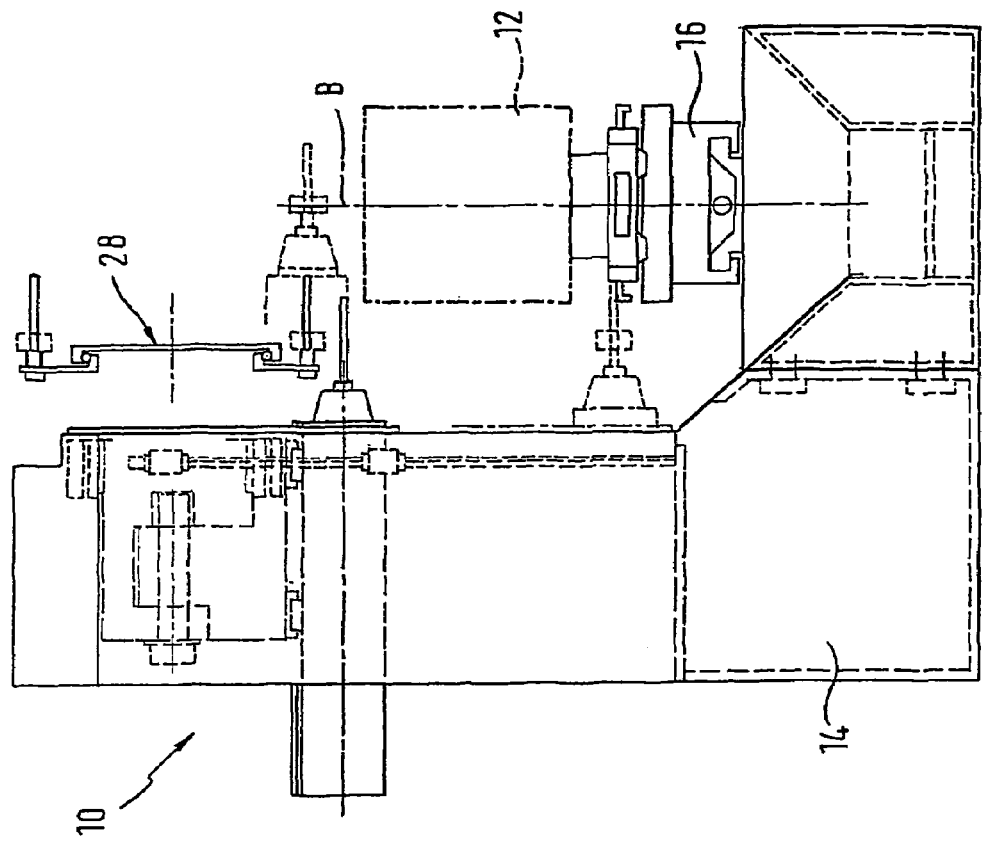
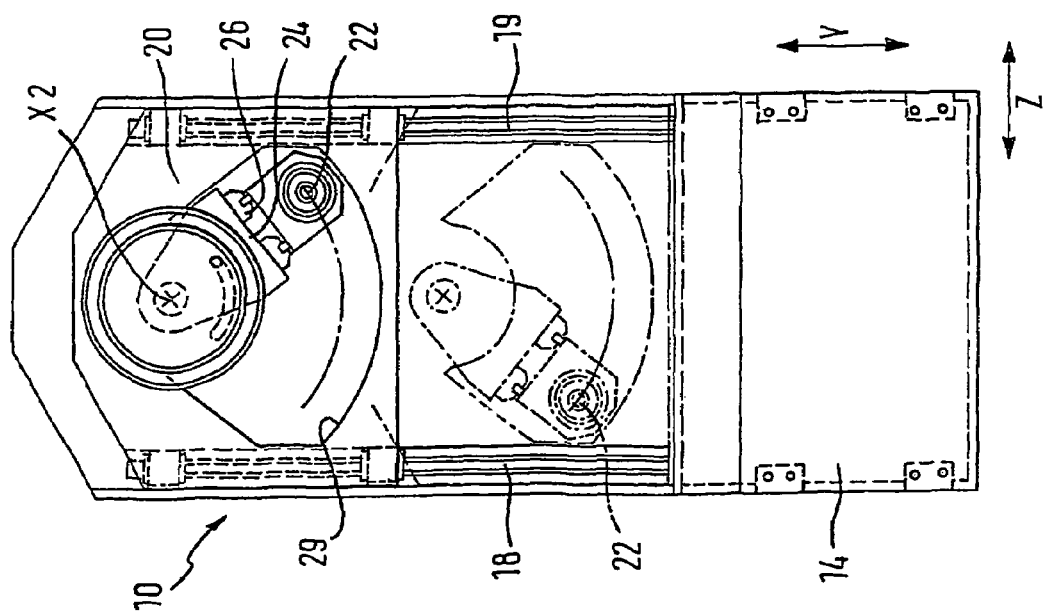

DEVICE FOR MACHINING WORKPIECES AND MACHINE ARRANGEMENT THEREFOR

FIELD OF THE INVENTION

The invention relates to a device for machining workpieces, with which workpieces can, in particular, be subjected to chip removing machining. Devices of this type serve for machining in a machining centre, i.e. subjecting the workpiece to a plurality of machining steps or machining processes, without any transfer of the workpiece from one machining station to another station having to take place. The invention also relates to a machine arrangement in which a device of the type described above is used.

STATE OF THE ART

Machining centres that are able to carry out a plurality of machining steps or machining processes on the workpiece without having reclamp the workpiece are known in production engineering.

For instance, the published application DE 33 30 942 describes an arrangement with a rotatable angle milling head and a rotatable workpiece clamping table, in order that the workpiece may be brought into various machining positions relative to the spindle. The spindle itself is firmly mounted on an arm and, together with the arm, can be pivoted about an axis running perpendicular to the rotation axis of the spindle, so that the spindle is able to perform a tilting movement relative to the workpiece. Furthermore, the workpiece can also be rotated about a further axis also perpendicular to the rotation axis of the spindle.

Known from the published application DE 196 16 526 is a machine tool for precision engineering, in particular for the machining of optical materials for the manufacture of optical components. In this device, a spindle is mounted on an arm, so that the rotation axis of the spindle runs parallel to the arm. The spindle can be moved along the arm and pivoted together with the arm, i.e. about an axis perpendicular to the rotation axis of the spindle.

Finally, FR 2 528 745 describes a device for three-dimensional machining of workpieces. For that purpose, a spindle is mounted on a drum-like element, whereby the drum-like element is itself rotatable within a block. By rotation of the drum-like element, the spindle is also moved such that different machining positions can be achieved. In order to cover the further spatial directions, a linear displacement is provided in each of two mutually perpendicular directions. The spindle itself is relatively confined in the interior of the drum-shaped element and arranged with the latter in the block which accommodates the drum element.

DESCRIPTION OF THE INVENTION

It is an object of the present invention to provide a device for machining workpieces, in particular for chip removing machining of workpieces, which is simply constructed, enables good chip removal and has a rigid basic structure.

This object is achieved with a device having a spindle mounted at a first end of a pivoting arm so as to be linearly displaceable in a direction parallel to the axis of rotation of the spindle, and a console, on which the pivoting arm is mounted at its second end so as to be rotatable about an axis parallel to the rotation axis of the spindle, wherein the console is displaceable in a Y-direction which is perpendicular to the displacement direction of the spindle in all of the pivoting positions of the pivoting arm.

The invention is based on the concept of separating the drive from the chip removal area, so that good chip deflection and chip removal are enabled, so as not to impede the drive and the guideways for the individual displacement movements. This is achieved in that one of the axes is not designed, as is usual, as a linear axis, but that a rotation movement of a lever is provided, at the end of which the spindle is mounted so as to be linearly displaceable. By this means, it is possible to exploit the fact that the free end of the lever sweeps over a relatively large region, i.e. to replace the linear movement usually provided, whilst access by the spindle to the workpiece remains simultaneously assured, since the spindle is mounted on the free end of the pivoting arm.

Advantageous embodiments are characterized by the remaining claims.

According to a preferred embodiment, the console on which the pivoting arm is articulated can be displaced in the vertical direction and the pivoting arm can be pivoted about a horizontal axis, so that the spindle is also disposed horizontally. By this means, it is avoided—as would be the case with a vertical spindle position—that chips can remain in the workpiece lying on the table in the device. Rather, in this case, the chips fall freely downwards into a disposal channel provided in the machine bed. This offers advantages, in particular when dry machining.

Preferably, for linear displacement in the Y-direction, which also advantageously is the vertical direction, two guide rails are provided. The guide rails are preferably designed such that they extend vertically upwards from a machine bed and respectively support the console in the region of its edges. This may particularly be achieved in an advantageous manner if the console is plate-shaped, so that the guideways may be mounted on one side of the plate, that is, on a large plate surface, or on opposing narrow sides of the plate. In that case, the pivoting arm preferably lies in a central region of the plate surface and does so such that the arrangement is symmetrical to an axis running centrally between the two guide rails. By means of this arrangement, good chip disposal can also be achieved and additionally good access to the workpiece may be ensured. It is also possible to cover the axis, that is, the linear guideways for displacement in the Y-direction, well against chips. The covering concept may be kept simple since the axes are not placed, as is usual, as linear displacement axes on top of each other, whereby a bulky arrangement would necessarily result.

The device also offers the advantage that, in particular when the linear guideways for displacement in the Y-direction are arranged vertically, the spatial arrangement does not differ from currently used conventional variants with respect to the position of the pallets relative to the device. Indeed, horizontally positioned pallets could still be used, so that on loading, the already existing clamping devices can be used.

Advantageously, a linear direct drive is used for driving the linear displacement movement of the spindle on the pivoting arm and/or the displacement movement of the console. Using these drives, high acceleration rates can be reached. In a similar manner, advantageously a direct drive can also be used for the rotation movement of the pivoting arm, in this case a circular drive. High acceleration rates can be achieved with this also. Alternatively, other known drive variants can also be used both for the linear displacement movements and for the pivoting movement of the pivoting arm.

The plate-shaped console can be designed fundamentally in any suitable manner. It is advantageous, however, if the plate-shaped console is equipped with an aperture or a recess, through which the spindle projects. The aperture or recess is naturally designed such that the freedom of movement of the spindle is not impaired during the pivoting movement.

Advantageously, the device according to the invention is combined into a machine arrangement with a rotary table for clamping a workpiece. Instead of a rotary table of this type, which may for instance be designed as a numerally controlled circular table, swivelling clamping devices with an A-axis and a B-axis or swivelling clamping devices with a swivel-axis and two A-axes and associated B-axes are also possible as alternatives. Depending upon the choice of workpiece clamping device, that is, for instance, of the rotary table and of the reversible clamping device, the flexibility of the device may be further improved with regard to the machining of workpieces.

The device according to the invention can, in particular, advantageously be used for various versions of the machine arrangement, resulting in a modular concept. For instance, with the device a single-spindle concept, a dual-spindle concept or a so-called synchronous concept can be realised, i.e. it is alternatively possible according to the invention to use a free-standing device in combination with a workpiece clamping device, to combine two devices with a workpiece clamping device, or to equip two devices with two workpiece clamping devices, so that simultaneous machining of a plurality of workpieces or of one workpiece from a plurality of sides is possible. With the dual-spindle concept, alternatively, just one spindle may undertake machining at a particular time, whilst the second spindle is undertaking a tool change, so that the set-up/changeover times on a tool change are reduced.

If a workpiece is machined with two spindles simultaneously, optionally a workpiece clamping device can be used which permits or does not permit rotation of the workpiece about a B-axis, i.e. an axis perpendicular to the spindle rotation axes. Depending upon the purpose, this can bring advantages with regard to short chip-to-chip times. In particular, it is no longer a linear axis that is used for the reversing movement between two spindles, but rather the rotational axis B of the rotary table. By this means, a compact machine arrangement may be achieved which supports the basic concept of the device, namely of achieving a very compact and rigid basic structure, whereby only small masses are moved, leading to high dynamic values and thus enabling the use of direct drives.

With regard to workpiece handling, various versions are also advantageous. For instance, a plate changer with manual, in-process loading can be provided, or a plate changer with in-process robot loading in the form of a portal or articulated arm design, allowing direct loading with a robot on the NC rotary table or other common variants.

Tool loading can also be realised in a very compact form with the present device, specifically in that the tool loading takes place directly via the main spindle into the tool magazine.

Summarising, with the device according to the invention, a device for machining workpieces can be achieved that can be employed as a modular arrangement and allows a very compact and rigid basic structure, so that high dynamic values are achieved. By this means, the device according to the invention can be utilised particularly well for light metal machining, whereby, however, use for machining of cast irons or steel is also conceivable.

BRIEF DESCRIPTION OF THE DRAWINGS

The invention will now be described, using examples, by reference to the attached drawings, in which:

FIG. 1 shows a front view of the device according to the invention;

FIG. 2 shows a side view of the device according to the invention with a rotary table;

WAYS TO CARRY OUT THE INVENTION

Figure 3:
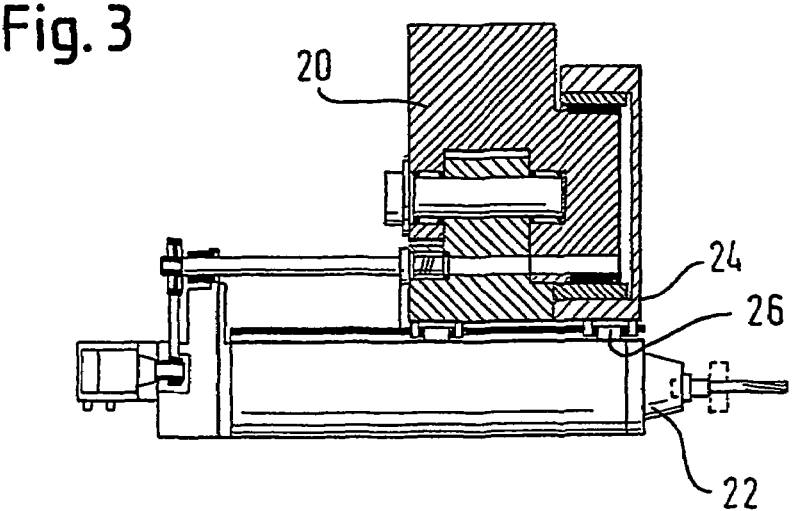
FIG. 3 shows a cross-section through the console with an articulated pivoting arm of the device according to the invention as in FIG. 1.

FIGS. 1 and 2 show a device 10 according to the invention for machining a workpiece 12 in, respectively, a front view and a side view. The device comprises a machine bed 14 on which is mounted a rotary table 16 for fixing and rotatable holding of a workpiece 12. In the embodiment shown in FIG. 2, the rotary table can carry out a rotational movement about an axis B, i.e. about an axis running perpendicular to the axis of rotation of the spindle and running vertically in the embodiment shown in FIG. 2. In place of the rotary table 16, another workpiece clamping device may alternatively be used, such as for instance a reversible clamping device.

As is most clearly apparent from FIG. 1, two guideways 18, 19 rise up from the machine bed 14, serving as a displacement apparatus for a console 20 in the Y-direction, i.e. in the up-down direction in the embodiment shown in FIGS. 1 and 2. In order to displace the console 20 along the guideways 18, 19, linear drives are provided in order to achieve high accelerations and therefore good dynamics in the device 10, so that the console 20 can be moved steplessly along the guideways 18, 19 from the upper position shown in FIG. 1 with continuous lines into other positions lying vertically thereunder, in order to move the spindle 22 into various machining positions relative to the workpiece 12. A lowest possible machining position is shown with dot-dashed lines in FIG. 1.

A pivoting arm 24 is rotatably mounted on the console 20 which, as is apparent from FIG. 3, is designed as a plate-like structure. The pivoting arm 24 is preferably attached to the console 20 by means of a circular drive, as is most clearly shown in FIG. 3. By this means, a high dynamic performance can be achieved for the rotation movement of the pivoting arm 24 with the spindle 22 mounted thereon, so that a movement in the Z-axis direction (right-to-left movement in FIG. 1) is also possible with good dynamics.

The spindle 22 is mounted on the free end of the pivoting arm, which can for instance—as shown in FIGS. 1 to 3—carry out a pivoting movement from a first starting position through approximately 120° into an end position and can naturally also be fixed in every intermediate position, such that said spindle is displaceable on the guideways 26 by means of a linear drive parallel to the spindle rotation axis, i.e. in the X-axis direction.

As can be seen from the FIGS. 1 to 3, a spatial movement of the device 10 which is usually also carried out as a linear movement, is therefore executed by means of a rotary movement. It is thereby possible to design the arrangement to be compact and, in particular, to arrange all the guideways and drives separate from the chip removal area which, in FIG. 1, is provided in the region of the machine bed 14, specifically to place them in the region of the console 20. It is therefore possible to protect the guideways and drives against chips and, for instance, to provide suitable coverings so that the device can also be utilised without difficulty for light metal machining.

Furthermore, by means of the workpiece clamping table 16, which can be designed as a conventional rotary table, the workpiece can also be rotated, so that a higher degree of flexibility in the machining and therefore less changeover time is required for the workpiece.

FIG. 2 also shows a tool-changing magazine 28 which is arranged such that the tools can be changed directly from the magazine into the spindle. For this purpose, the spindle must only be moved into a tool-changing position.

Figure 4:
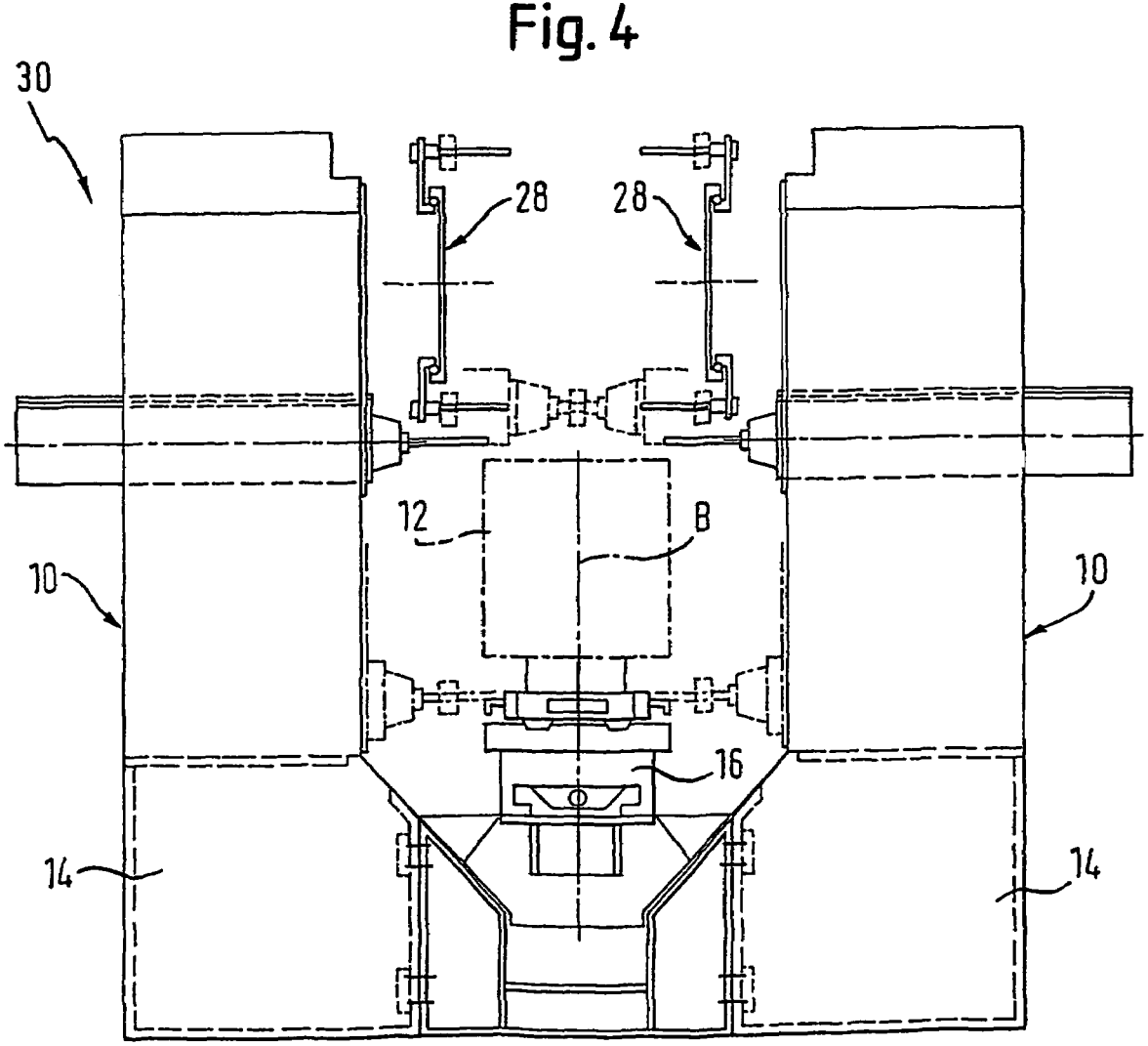
FIG. 4 shows a machine arrangement with the device according to the invention in a dual-spindle version.

Apart from the single-spindle version shown in FIGS. 1 and 2, which should be regarded as the basic version, it is also possible to combine two of the devices 10 according to the invention to make a dual-spindle version 30. An embodiment of this type is illustrated in FIG. 4. In this case, two devices 10 are arranged lying symmetrically opposite each other at a workpiece clamping table 16 which, in accordance with the embodiment shown in FIG. 2, is designed as a rotary table. In particular, the workpiece clamping table 16 lies between the two devices 10, which are arranged with mirror-image symmetry about the rotation axis B of the workpiece clamping table, such that the spindles are oriented towards each other in order to be able to undertake simultaneous or alternating machining on the workpiece 12, which is clamped on the workpiece clamping table 16.

Figure 5:
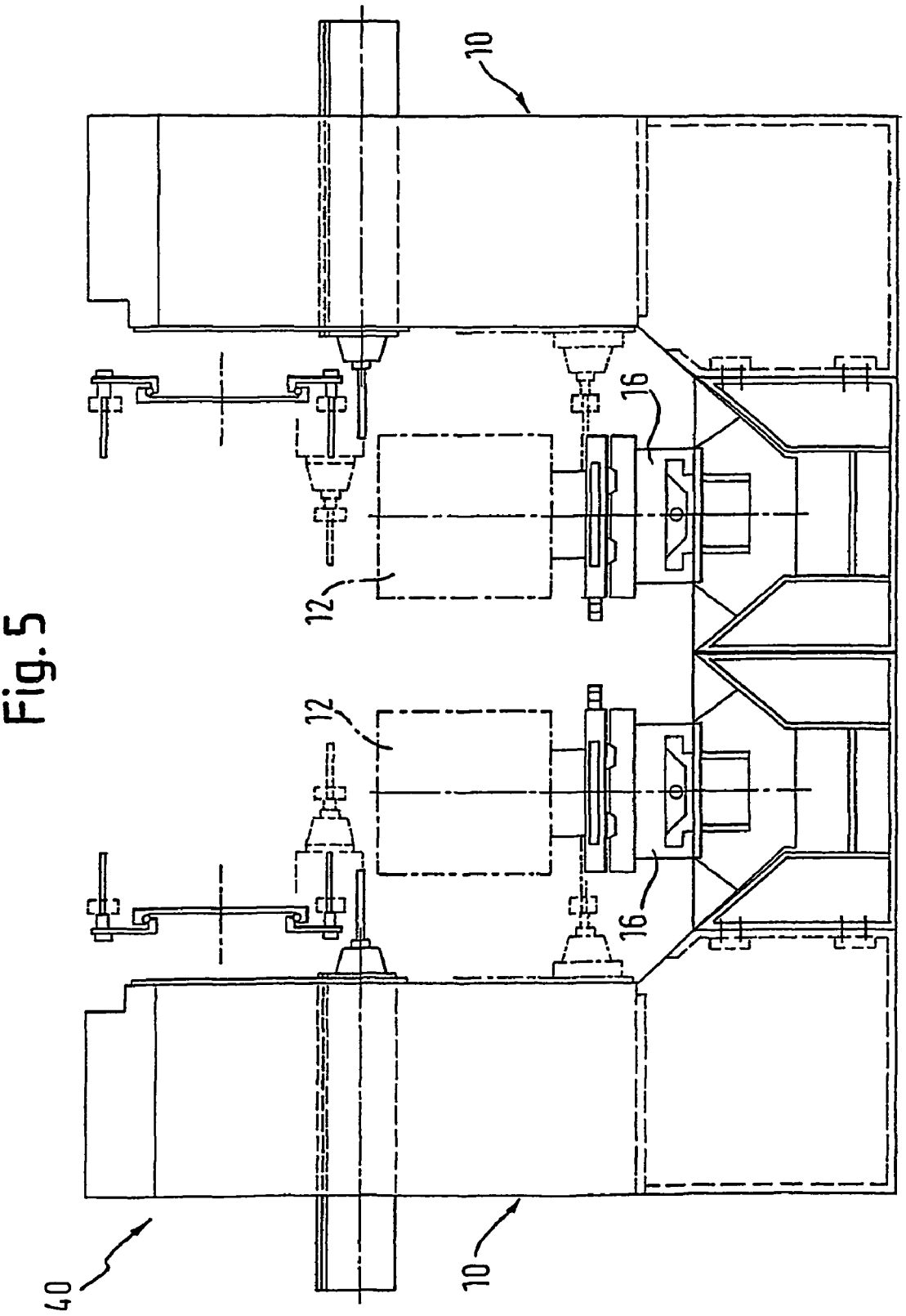
FIG. 5 shows a machine arrangement with the device according to the invention in a synchronous arrangement.

As can be seen from FIG. 5, a further alternative, a so-called synchronous unit, can be made from two devices 10 and two workpiece clamping units, for instance two rotary tables 16. The synchronous device 40 is made from the dual-spindle embodiment shown in FIG. 4 in that a further workpiece clamping table 16 is introduced between the two machining devices 10. Therefore two workpieces may be simultaneously machined independently of each other in a very compact space.

The essential aspect of the invention lies therein that by means of the compact arrangement of the spindle adjusting apparatus, i.e. with two linear drives for carrying out the Y-movement and the X-movement and a rotary drive for carrying out the Z-movement, a compact arrangement can be created which, particularly in an arrangement as illustrated in FIGS. 1 to 5, i.e. an arrangement in which the spindle rotation axis runs horizontally, enables a spatial separation to be created between the drive components and the chip removal area, so that chip removal does not interfere with the drive components, and particularly the guideways and drives. At the same time, the device is made compact by the arrangement according to the invention, so that relatively small masses have to be moved and high dynamic values can thereby be achieved.

The invention claimed is:

1. Device for machining a workpiece, for chip removing machining, comprising:
    a spindle, mounted at a first end of a pivoting arm so as to be linearly displaceable along the pivoting arm in a direction parallel to the axis of rotation of the spindle;
    a console, on which the pivoting arm is mounted at its second end so as to be rotatable about an axis parallel to the rotation axis of the spindle via a circular direct drive, with the console being displaceable in a direction which is perpendicular to the displacement direction of the spindle in all of the pivoting positions of the pivoting arm.

2. The device according to claim 1, wherein the console can be displaced in the vertical direction and the pivoting arm can be pivoted about a horizontal axis.

3. The device according to claim 1, wherein two guide rails are provided for linear displacement of the console in the direction which is perpendicular to the displacement direction of the spindle.

4. The device according to claim 1, wherein the console is designed plate-shaped and the pivoting arm is articulated in a central region of the plate surface.

5. The device according to claim 3, wherein the guide rails are arranged in edge regions of the plate-shaped console.

6. The device according to claim 1, wherein the pivoting arm is attached to the console by means of the circular direct drive.

7. The device according to claim 1, wherein a linear direct drive is provided as the drive for the displacement movement of the spindle on the first end of the pivoting arm and/or for the displacement movement of the console (20).

8. Device according to claim 4 wherein the plate-shaped console has an aperture or a recess, through which the spindle projects.

9. Machine arrangement comprising a device according to claim 1 and a rotary table for clamping the workpiece.

10. The machine arrangement according to claim 9, wherein the rotary table has a rotary axis parallel to the displacement direction of the console.

11. Machine arrangement comprising two of the devices according to claim 1, and also including a rotary table for clamping the workpiece, the rotary table being arranged between the two devices and the spindles of the two devices being oriented towards each other.

12. The machine arrangement according to claim 11, including a second rotary table, both rotary tables lying between the devices.

* * * * *